March 23, 1965 E. U. SOWERS III 3,174,497

FLUID POWER AMPLIFIER NOT-GATE

Filed Sept. 4, 1962 2 Sheets-Sheet 1

INVENTOR.
EDWIN U. SOWERS, III

BY Griffin and Stokes
ATTORNEYS

March 23, 1965 E. U. SOWERS III 3,174,497

FLUID POWER AMPLIFIER NOT-GATE

Filed Sept. 4, 1962 2 Sheets-Sheet 2

1

3,174,497
FLUID POWER AMPLIFIER NOT-GATE
Edwin U. Sowers III, Silver Spring, Md., assignor to Sperry Rand Corporation, New York, N.Y., a corporation of Delaware
Filed Sept. 4, 1962, Ser. No. 220,985
13 Claims. (Cl. 137—81.5)

The present invention relates to pure fluid amplifiers for performing logical functions. More particularly, the present invention provides pure fluid amplifiers for performing the logical Not or Inhibit function, said amplifiers having means for producing a power stream jet, at least one control stream jet, and at least one inhibit stream jet, said amplifiers being characterized by the fact that the inhibit stream jet flows in a path which is substantially normal to the plane in which the control and power stream jets flow.

Pure fluid amplifiers comprise a relatively recent addition to the field of data processing and control. Basically, a fluid amplifier comprises a power stream input channel, one or more control stream input channels, a plurality of output channels, and an interaction chamber, said channels being arranged such that selectively generated fluid control streams striking the power stream in the interaction chamber deflect the power stream into a desired output channel.

There are two basic types of fluid amplifiers. Amplifiers of the first type employ a special configuration of the interaction chamber to maintain the power stream in a given path of flow even after the control stream which initially deflected the power stream has stopped flowing. These are referred to as boundary layer controlled amplifiers. Amplifiers of the second type employ the principle of momentum exchange. That is, the power stream moving in a given direction through the interaction chamber is deflected so that it flows in a different direction as a result of the momentum imparted thereto when it is struck by a control stream. The present invention relates primarily to amplifiers employing the principle of momentum exchange.

Pure fluid amplifiers employing the principle of momentum exchange have heretofore been employed to perform the logical functions of And, Or and Not (inhibit). However, the prior devices have been designed such that all control streams representing the variables in a logical function flow in a single plane in the interaction chamber, the power stream also flowing in the same plane in the interaction chamber. In some of these devices the Inhibit function is accomplished by employing an inhibit control stream having a momentum greater than the momentum of the control streams representing the other functions.

Assume that it is desired to produce an output X according to the logical equation $X=(A+B)\cdot\overline{C}$ where $+$ represents the logical Or and $\cdot$ represents the logical And function. In a typical prior art device this is accomplished by providing control stream jets A and B each capable of imparting momentum M to the power stream upon striking it, M being sufficient to deflect the power stream from its normal path of flow to a direction representing the function X. The control streams A and B are coplanar with each other and the power stream. A third control stream jet is provided capable of imparting momentum to the power stream upon striking it. The third control stream jet is coplanar with control stream jets A and B and the power stream but flows in the direction opposite to that in which jets A and B flow. Therefore, if jet C is not present but either jet A or jet B or both jets A and B are present, the power stream is deflected to represent the function X. On the other hand, if jet C is present the momentum it imparts to the power

2 stream is sufficient to offset the momentum imparted to the power stream by either jet A or jet B or both jets A and B. This prevents the power stream from being deflected to the direction indicating the function X.

From the above discussion it is seen that prior art devices for performing the logical Inhibit function have two major disadvantages. First, all control jets including the inhibit jet must flow in substantially the same plane with each other and the power stream. At times this prevents the most efficient use of space when it is desired to interconnect a plurality of fluid logical elements in a compact unit. Second, the inhibiting control jet must have a momentum equal to the total momentum of all the other control streams thus requiring that special consideration be given to the size and velocity of each control stream. Inherent in the latter feature is the fact that more power is required to accomplish the Inhibit function than is required to accomplish other logical functions.

Accordingly, an object of the present invention is to provide a fluid amplifier means for performing the logical Inhibit function, the construction of said amplifier means being such that all control jets do not flow in the same plane.

An object of the present invention is to provide means for generating an inhibit control stream jet which flows substantially normal to the plane of the power stream and other control stream jets in the interaction chamber of the fluid amplifier.

An object of this invention is to provide a fluid amplifier operating on the principle of momentum exchange, said amplifier having means for introducing into the interaction chamber of said amplifier an inhibiting jet which flows substantially normal to the plane in which the jower jet and remaining control jets of said amplifier normally flow.

A further object of this invention is to provide a pure fluid amplifier having means for producing an inhibiting jet which flows at a substantial angle to the plane in which the control and power jets flow, said inhibiting jet striking said power jet upstream from the region where said control jets normally strike said power jet to thus deflect the power jet so that it is not struck by the control jets. The amplifier is provided with a plurality of output channels into which the power jet may flow depending upon the presence or absence of the inhibit jet and one or more control jets, one of said output channels being conneected to the interaction chamber of the amplifier in a region to receive the power jet any time the inhibit jet is present and irrespective of the presence or absence of one or more control jets.

Another object of the invention is to provide a pure fluid amplifier having a power stream input channel, a plurality of output channels, a plurality of control stream channels and a plurality of inhibit stream channels. The control stream channels terminate at orifices in the interaction chamber of the amplifier so that fluid signals applied thereto may selectively deflect the power stream into a first or a second path of flow. One of the inhibit stream channels is located along the first path of flow of the power stream after it has been deflected so that an inhibit stream issuing therefrom deflects said power stream into a third path of flow. Another of the inhibit stream channels is located along the second path of flow of the power stream after it has been deflected so that an inhibit stream issuing therefrom deflects said power stream into a fourth path of flow.

Still another object of this invention is to provide a pure fluid amplifier having a power stream input channel terminating at a first orifice in an interaction chamber, a first output channel into which said power stream normally flows, a control stream input channel terminating at a second orifice in said interaction chamber such that a control stream flowing therein deflects said power stream in one direction, a second output channel into which said power stream flows when deflected by the control stream, an inhibit stream channel terminating at a third orifice in said chamber, said third orifice being positioned upstream from said second orifice and downstream from said first orifice whereby a inhibit stream issuing therefrom deflects the power stream in another direction, and a third output channel for receiving the power stream when it is deflected by the inhibit stream.

Futher objects of the invention and its mode of operation will become apparent upon consideration of the following description and the accompanying drawings in which.

The pure fluid amplifiers subsequently described may employ air or another gas or water or another liquid as the working fluid. If desired, solid particles may be entrained in the working fluid. The amplifiers may be constructed of plastic, metallic, ceramic or other material. For ease of illustration they are shown in the accompanying drawing as being made of a clear plastic material.

The amplifiers may comprise three flat plates. The desired channel configuration is cut, etched, stamped or otherwise formed in one of the plates. This plate is then covered on each side with the other two plates and the plates are screwed or otherwise bonded together to form a substantially solid body. The outer plates are then bored and tapped so that pipes may be attached to apply signals to and convey signals from the amplifier. This construction is well known in the art. It should be understood that the term channel as used herein refers to pipes, tubes, closed ducts or other closed passageways for conveying fluid.

Figure 1:
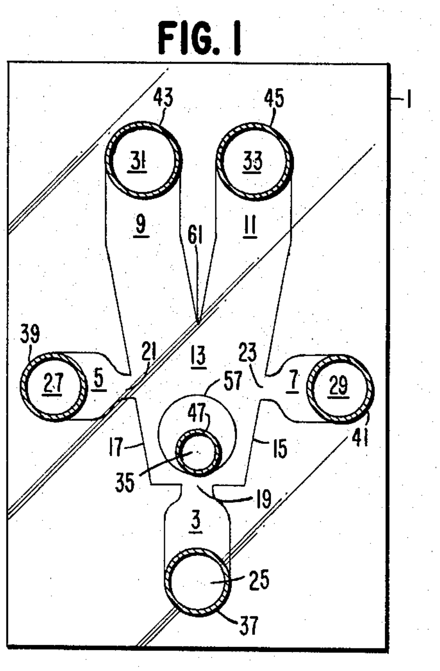
FIGURES 1 and 2 are front and side views, respectively, of a first embodiment of the invention.
Figure 2:
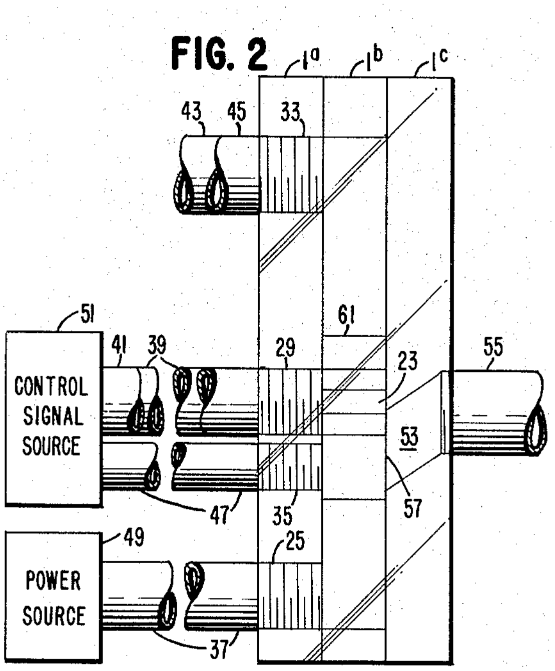

Referring now to FIGURES 1 and 2, a first embodiment of the invention comprises three substantially flat plates 1*a*, 1*b* and 1*c* which are held together in a fluid-tight relationship by any conventional means such as an adhesive material.

The center plate 1*b* has a channel and chamber configuration formed therein as illustrated in FIGURE 1. The configuration includes a power stream input channel 3, first and second control signal input channels 5 and 7 and first and second output channels 9 and 11. The output channels 9 and 11 intersect to form an interaction chamber 13. The chamber is bounded by walls 15 and 17 which are offset from the edge of orifice 19 where the power stream input channel connects with the chamber. Control signal input channels 5 and 7 terminate at opposed orifices 21 and 23 in the walls 17 and 19, respectively. These orifices are positoned such that control jets issuing therefrom strike a power jet issuing from orifice 19 and deflect it into one of the output channels. Although shown as being located at approximately the same distance downstream from orifice 19 this particular arrangement is not necessary and one orifice may be located further upstream than the other.

Bores 25, 27, 29, 31, 33 and 35 in plate 1*a* communicate with channels 3, 5, 7, 9 and 11 and chamber 13. The bores are internally threaded to receive hollow tubes or channels 37, 39, 41, 43, 45 and 47 which are externally threaded.

Channel 37 is connected to a power source 49 which provides a continuous stream of fluid. Source 49 may be a conventional pump or compressor and preferably includes pressure regulating means so that a substantially constant flow of fluid is maintained through channel 37.

Channels 39, 41 and 47 are connected to a source 51 which selectively provides fluid control signals. Source 51 may, for example, be other pure fluid logical elements in a data processing system.

Channels 43 and 45 are output channels communicating with channels 9 and 11. Fluid flow through these channels provides an indication of the signals applied to amplifier 1 from the control signal source.

Plate 1*c* has a single channel 53 extending through it. Channel 53 is threaded at one end to receive a threaded output channel 55. At its opposite end channel 55 terminates at an opening 57 in chamber 13. Opening 57 is on the opposite side of chamber 13 from bore 35 and etxends downstream therefrom to receive a power stream issuing from orifice 19 after it has been deflected by a fluid stream issuing from bore 35.

The embodiment shown in FIGURES 1 and 2 functions as follows. Power source 49 continuously supplies a stream of fluid, called the power stream, to channel 37. The power stream flows through bore 25 and input channel 3 and emerges from orifice 19 as a high velocity power jet stream. The walls 15 and 17 and dividing element 61 are symmertically arranged with respect to the axis of the jet as it emerges from orifice 19. Furthermore, walls 15 and 17 are offset from orifice 19 by a distance great enough to prevent the well known boundary layer "lock-on" phenomenon. Preferably some means such as a connecting channel (not shown) is provided to equalize the pressures in the regions between the power jet and walls 17 and 15.

Under the conditions set forth above the power jet emerging from orifice 19 passes through chamber 13, strikes dividing element 61 and splits into two substantially equal parts. One part flows into channel 9 and through bore 31 to output channel 43. The other part flows into channel 11 and through bore 33 to output channel 45.

Assume now that control signal source 51 applies a fluid signal to channel 39. The fluid passes through bore 27 and channel 5 and emerges from orifice 21 as a high velocity control jet stream. This control jet strikes the power jet emerging from orifice 13 thus deflecting the power jet so that it flows entirely into channel 11 and through output channel 45. Thus, the presence of a fluid control signal in channel 5 only is evidenced by increased pressure and fluid flow in output channel 45 with a corresponding decrease in fluid flow in output channel 43. When the control jet ceases to flow from orifice 21 the power jet returns to its normal path of flow and divides equally between channels 9 and 11.

Assume that control signal source 51 applies a fluid signal to inhibit signal channel 47 at the same time it applies a control signal to channel 39. The fluid inhibit signal flows through channel 47 and emerges from bore 35 as a high velocity jet. This jet strikes the power stream deflecting it into opening 57 from whence it flows into output channel 55. The bore 35 and opening 57 are upstream from where a control jet issuing from orifice 21 normally strikes the power jet hence a jet issuing from orifice 21 does not strike the power jet if it is first deflected by the inhibit jet. If the inhibit jet is terminated but the control jet continues to issue from orifice 21 the power stream stops flowing into channel 55 and is deflected by the control jet so that it flows into channel 11. On the other hand, if the inhibit and control jets are terminated simultaneously the power jet returns to its normal path of flow where it divides equally between channels 9 and 11.

When control signal source 51 applies a fluid control signal to channel 41 fluid flows through bore 29 and channel 7 and issues from orifice 23 as a high velocity jet stream. This jet strikes the power jet deflecting it to the left of divider 61 so that all of the power stream flows through channel 9 and into output channel 43.

The effect of applying a control signal to channel 41 can be inhibited by simultaneously applying an inhibit signal to channel 47. Bore 35 and opening 57 are upstream from where a control jet issuing from orifice 23 normally strikes the power jet. The inhibit jet from bore 35 strikes the power jet thus deflecting the power jet into opening 57 and out of the path of the control jet issuing from orifice 23. If the inhibit jet is terminated first then the power stream tries to assume its normal state of flow but is deflected into channel 9 by the control jet from orifice 23. If the inhibit and control jets are terminated simultaneously then the power stream immediately assumes its normal state of flow and divides equally between channels 9 and 11.

The amount of power stream fluid flowing into output channel 9 when a control signal is applied to channel 7 is about twice as great as the amount of power stream fluid flowing therein when no control signal is present, assuming of course that there is no inhibit signal applied to channel 37. This difference in fluid flow may be detected by a discriminator circuit such as a single sided fluid amplifier operating on the principle of momentum exchange.

Additional control signal input channels may be provided on each side of the power stream provided their orifices are positioned such that control streams issuing therefrom intersect the power stream downstream from the opening 57.

Figure 3:
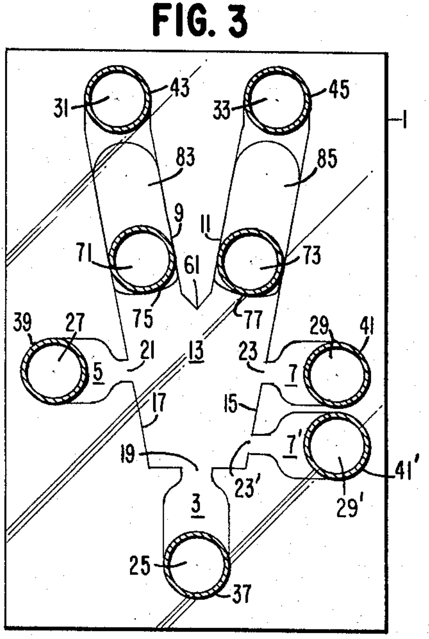
FIGURES 3 and 4 are front and side views, respectively, of a second embodiment.
Figure 4:
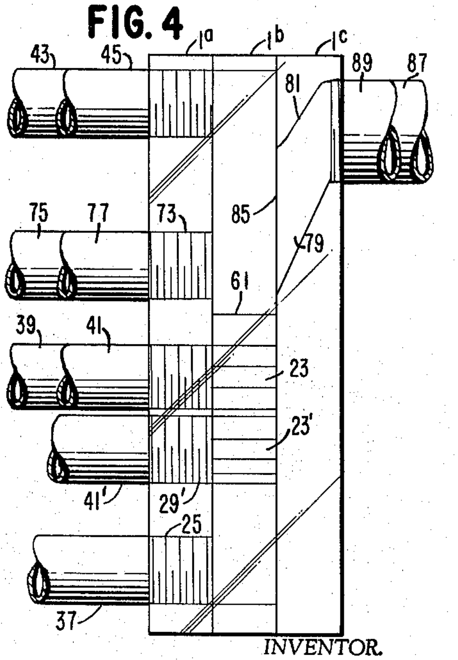

In FIGURE 1 the presence of an inhibit jet inhibits all fluid flow of the power stream into output channels 9 and 11. FIGURES 3 and 4 show an alternative embodiment wherein a separate inhibit means is provided for each of the output channels.

The embodiment shown in FIGURE 3 is similar in many respects to that shown in FIGURE 1 hence like elements bear the same reference numeral. As in FIGURE 1, walls 15 and 17 are offset from orifice 19 by a distance great enough to prevent the well known boundary layer "lock-on" phenomenon. Preferably some means such as a connecting channel (not shown) is provided to equalize the pressures in the regions between the power jet and walls 15 and 17.

The plate 1*b* has a channel and chamber configuration similar to the plate 1*b* in FIGURE 1. However, a second control signal input channel 7′ terminating at an orifice 23′ and connected by means of bore 29′ and channel 41′ to a source of control signals is provided to illustrate how the present invention may be incorporated with a device for performing the logical OR function.

Plate 1*a* is provided with two bores 71 and 73 of substantially the same width as output channels 9 and 11 and connecting therewith. Bores 71 and 73 are connected by means of channels 75 and 77 to a source of inhibit signals such as source 51 of FIGURE 1.

Plate 1*c* has channels 79 and 81 therein. These channels are positioned in plate 1*c* so that when plates 1*a*, 1*b* and 1*c* are joined the openings 83 and 85 at one end of channels 79 and 81 are aligned with output channels 9 and 11 and extend downstream from bores 71 and 73. The channels 79 and 81 join channels 9 and 11 at an angle which is determined by the deflection of a power stream when struck by an inhibit stream from bore 71 or 73. Preferably, the angle is made such that a deflected power stream flows substantially parallel to the axis of channel 79 or 81 after entering opening 83 or 85.

Channels 79 and 81 are threaded at one end and a pair of output channels 87 and 89 connected thereto.

The inhibit amplifier functions as follows. A power stream is continuously applied to input channel 3 and emerges from orifice 19 as a high velocity jet stream. In the absence of any control signals the power jet strikes dividing element 61 and flows equally through channels 9 and 11 to output channels 43 and 45.

A control signal applied to channel 5 causes a jet stream to emerge from orifice 21. The control jet strikes the power jet in the interaction chamber thus deflecting the power jet so that it flows to the right of dividing element 61 and into channel 11. Assuming no inhibit signal is being applied to channel 77 the power stream flows through channel 11 and into output channel 45. On the other hand, if a fluid inhibit signal is applied to channel 77 the fluid stream emerging from bore 73 strikes the power stream flowing through channel 11 and deflects it into opening 85 from whence it flows through channels 79 and 89.

Consider now the case where there is no inhibit signal but there is a control stream issuing from orifice 23 or 23′. The control stream strikes the power jet in the interaction chamber deflecting it to the left of dividing element 61. The power stream flows into channel 9 and out through channel 43. If an inhibit signal is applied to channel 75 at this time the power stream flowing through channel 9 is deflected into opening 83 and flows through channel 81 to output channel 87.

Finally, consider the case where an inhibit signal is applied to channel 75 but no control signals are applied to channels 5, 7 and 7′. The power stream strikes dividing element 61 and divides equally into channels 9 and 11. The inhibit signal from channel 75 strikes that portion of the power stream flowing into channel 9 and deflects it into opening 83 from whence it passes through output channel 87. Note, however, that the amount of power stream fluid flowing into channel 87 when the inhibit signal in channel 75 is the only control signal is approximately half the amount of power stream fluid flowing into channel 87 when the inhibit signal in channel 75 and a control signal from channel 7 or 7′ are both present. This difference in fluid flow may be detected by a flow discriminating means such as a single sided fluid amplifier employing the principle of momentum exchange. It is obvious therefore that the embodiment of FIGURE 3 is capable of performing the logical AND function as well as performing the logical OR and Inhibit functions. That is, full flow of the power jet into channel 87 occurs if there is a control signal applied to channel 7 or 7′ and an inhibit signal applied to channel 75.

The operation of the embodiment shown in FIGURE 3 may be defined by the following logical equations where A, B and C represent control signals in channels 5, 7 and 7′, respectively; M and N represent inhibit signals applied to channels 75 and 77, respectively; W, X, Y and Z represent full flow of the power stream in output channels 43, 45, 87 and 89 respectively, the dot (·) represents the logical AND function, the + represents the logical OR function, and the bar (—) represents the absence of a signal.

$$W=B+C\cdot\overline{M} \qquad Y=(B+C)\cdot M$$
$$X=A\cdot\overline{N} \qquad Z=A\cdot N$$

The operation of the device shown in FIGURE 3 has been described for the condition where inhibit signals are individually applied to channels 75 and 77. Obviously, channels 75 and 77 may be connected to the same source of inhibit signals so that they are activated simultaneously.

Figure 5:
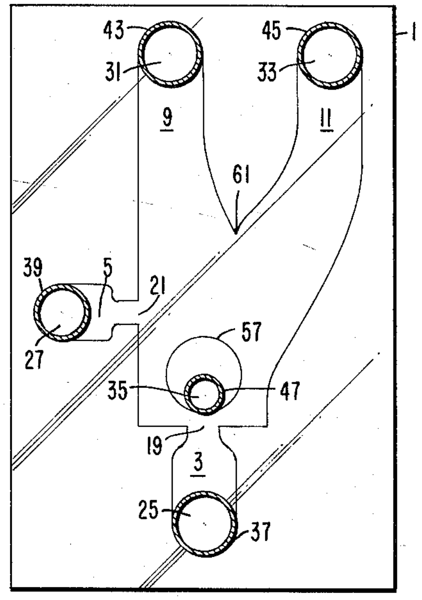
FIGURES 5 and 6 are front and side views of a third embodiment of the invention.
Figure 6:
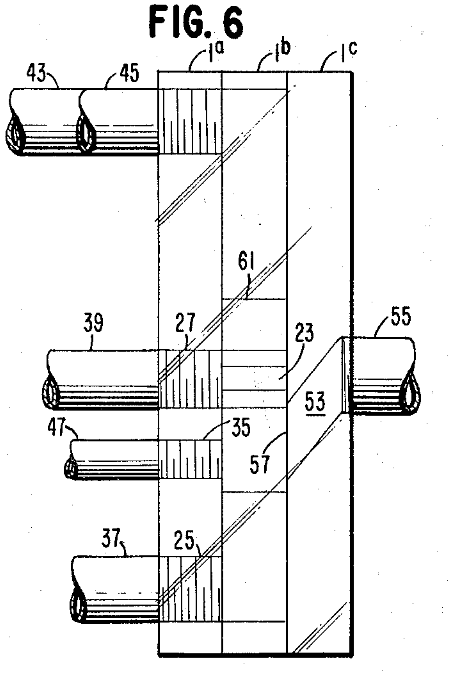

FIGURES 5 and 6 show a third embodiment of the invention wherein the normal state of the amplifier is represented by full flow of the power stream into a first output channel and the presence of a control signal is represented by full flow of the power stream into another output channel.

In plate 1*b* the power stream input channel 3, its orifice 19, dividing element 61 and channel 9 are positioned relative to each other such that the power stream issuing from orifice 19 normally flows to the left of dividing element 61 and into channel 9. The interaction chamber walls are sufficiently offset from the power jet nozzle 3, and a channel connecting the regions on opposite sides of the power jet may be added, so that boundary layer lock-on is prohibited.

A fluid signal applied to control signal input channel 5 causes a control jet to issue from orifice 21. The control jet strikes the power jet and deflects it to the right of dividing element 61 thus causing the power jet to flow into output channel 11. Upon termination of the control jet the power stream returns to its normal path of flow into channel 9.

Inhibit signal input channel 47 connects with interaction chamber 13 through an opening which admits an inhibit jet into the chamber in a direction which is normal to the plane in which the power stream normally flows or flows when deflected by a control signal from orifice 21. An opening 57 into inhibit signal output channel 53 is positioned in the wall opposite the one through which the inhibit signal enters the interaction chamber. Opening 57 extends downstream from the inhibit signal input to receive the power stream when it is deflected by an inhibit stream.

Both bore 35 and opening 57 are upstream from the region where a control jet from orifice 21 normally strikes the power jet. Therefore, regardless of the presence or absence of a control jet at orifice 21 an inhibit jet issuing from bore 35 deflects the power jet through opening 57 into output channel 53. Upon termination of the inhibit jet the power stream assumes its normal path of flow into channel 9 unless a control jet is issuing from orifice 21 in which case it is deflected into channel 11 until the control jet stops.

It will be recognized that the single inhibit signal input of FIGURE 5 may be replaced with double inhibit signal inputs as shown in FIGURE 3. The inhibit inputs may then be activated either singly or simultaneously.

While various preferred embodiments have been shown and described it will be obvious that various modifications therein may be made by those skilled in the art without departing from the spirit and scope of the invention. For instance, additional control signal inputs may be provided on either or both sides of the power stream path in the interaction chamber of FIGURES 1 and 3. Additional control signal inputs may be provided on the left side of the power stream path in the interaction chamber of FIGURE 5. Furthermore, the dividing element 61 and the orifices 21 in FIGURE 5 may be positioned such that all control signals must be present to deflect the power stream into output channel 11. It is intended therefore to be limited only by the scope of the appended claims.

I claim:

1. A pure fluid device for performing the logical Inhibit function, said device comprising: a body having a chamber therein; first and second output channels each terminating at one end at an opening in said chamber; a power stream input channel terminating at a first orifice in said chamber, said first orifice and said openings being positioned relative to each other such that a power stream emerging from said orifice normally flows into one of said openings but may be deflected into the other of said openings; a control signal channel terminating at a second orifice in said chamber for applying a fluid control stream to said chamber, said second orifice being positioned such that fluid flowing therethrough strikes and deflects a power stream emerging from said first orifice into the other of said openings; an inhibit signal input channel terminating at a third orifice in said chamber, said third orifice being positioned downstream from said first orifice and upstream from the point at which said fluid control stream from said second orifice normally strikes said power stream, said third orifice being further positioned such that a fluid inhibit stream emerging therefrom deflects said power stream out of the plane in which said control stream and said power stream normally flow; and a third output channel terminating at an opening in said chamber said opening being positioned to receive said power stream only after it has been deflected by said fluid inhibit stream.

2. A pure fluid device as claimed in claim 1 and further comprising: means for applying a stream of fluid to said power stream input channel; means for selectively applying fluid control signals to said control signal input channel to selectively deflect said power stream to said other opening; and means for selectively applying fluid inhibit signals to said inhibit signal input channel to inhibit deflection of said power into said other opening.

3. A pure fluid device for performing the logical Inhibit function, said device comprising: a body having a chamber therein; first and second output channels terminating at first and second openings in said chamber; a power stream input channel terminating at a first orifice in said chamber, said first orifice and said openings being positioned relative to each other such that a power stream emerging from said orifice normally flows into said first opening but may be deflected into said second opening; first and second control signal channels terminating at orifices in said chamber for selectively applying fluid control streams to said chamber, the orifice of said first control signal channel being positioned such that fluid flowing therethrough strikes and deflects a power stream emerging from said first orifice into said second opening and said second control signal orifice being positioned such that fluid flowing therethrough strikes and deflects a power stream emerging from said first orifice into the first of said openings; an inhibit signal input channel terminating at a third orifice in said chamber, said third orifice being positioned downstream from said first orifice and upstream from the point at which said fluid control streams from said control signal orifices normally strike said power stream, said third orifice being further positioned such that a fluid inhibit stream emerging therefrom deflects said power stream out of the plane in which it normally flows into said first or said second opening; and a third output channel terminating at an opening in said chamber, said opening being positioned to receive said power stream only after it has been deflected by said fluid inhibit stream.

4. A pure fluid device as claimed in claim 3 and further comprising: means for applying a stream of fluid to said power stream input channel; means for selectively applying fluid control signals to said control signal input channels to selectively deflect said power stream into said first or said second opening; and means for selectively applying fluid inhibit signals to said inhibit signal input channel to inhibit deflection of said power stream into either said first or said second opening.

5. A pure fluid device for performing the logical Inhibit function, said device comprising: a pure fluid amplifier having a first state in which the power stream of said amplifier flows into a first output channel in response to fluid signals applied to a first control signal channel and a second state in which said power stream flows into a second output channel in response to fluid signals applied to a second control signal channel, the paths of flow of said power stream in said states being coplanar; and means for inhibiting the flow of said power stream into either of said output channels, said inhibit means including means for deflecting said power stream out of the plane of flow assumed during said states, and output channel means for receiving said power stream when it is deflected out of said plane.

6. A pure fluid device as claimed in claim 5 wherein said deflecting means comprises an inhibit signal input channel terminating at an orifice adjacent to the path of flow of said power stream which is common to both said first and said second state.

7. A pure fluid device as claimed in claim 5 wherein said deflecting means comprises first and second inhibit signal input channels terminating at first and second orifices, said first and second orifices being respectively positioned adjacent the paths of flow of said power stream unique to said first and second states, said output channel means comprising channel means terminating at openings positioned to receive said power stream when it is deflected by a signal from either said first or said second inhibit signal input channel.

8. In a pure fluid amplifier of the type having a chamber, first and second output channels terminating at first and second openings in said chamber, a power stream input channel terminating at one orifice in said chamber, and first and second control signal channels terminating at further orifices in said chamber whereby a fluid power stream emerging from said one orifice may be deflected into said first or said second opening by fluid signals emerging from said further orifices, the improvement comprising: an inhibit signal input channel terminating at still another orifice in said chamber, said last named orifice being positioned upstream of said power stream from said further orifices and in a plane which is at a substantial angle with the planes of said further orifices whereby fluid inhibit signals issuing from the orifice of said inhibit signal input channel deflect said power stream out of the path of fluid signals emerging from said further orifices; and a third output channel terminating at an opening in said chamber for receiving said power stream when it is deflected by said fluid inhibit signals.

9. A pure fluid device for performing the logical Inhibit function, said device comprising: a pure fluid amplifier having first and second output channels interconnected to form a chamber, a power stream input channel terminating at a first orifice in said chamber, said first orifice being positioned whereby a power stream flowing through said orifice may flow into said first or said second output channel, and first and second control signal channels terminating at second orifices in said chamber, the axes of said second orifices intersecting the axis of said first orifice; and inhibit means, said inhibit means including an inhibit signal input channel terminating at a third orifice in said chamber, the axis of said third orifice intersecting the axis of said first orifice upstream from where said first and second axes intersect; means for applying a stream of fluid to said power stream input channel; means for selectively applying fluid control signals to said control signal channels to thereby selectively deflect said power stream into said first or said second output channel; means for selectively applying fluid inhibit signals to said inhibit signal channel to deflect said power stream; and a third output channel for receiving said power stream only when it is deflected by said inhibit signals.

10. In a pure fluid amplifier having a power stream input channel and first and second output channels interconnected to form first and second substantially coplanar paths of fluid flow said paths being common along a portion thereof, and first and second control signal input channels terminating at first orifices adjacent the common portion of said paths of said power stream for selectively deflecting said power stream into said first or said second output channel, the improvement comprising: inhibit means for inhibiting the flow of said power stream into said first or said second output channel, said inhibit means comprising first and second inhibit signal channels terminating at second orifices adjacent unique portions of said first and second paths of fluid flow, said orifices being positioned such that fluid inhibit signals issuing therefrom deflect said power stream from said first and second paths of fluid flow, and output channel means for receiving said power stream when it is deflected by said inhibit signals.

11. A pure fluid device for performing the logical Inhibit function, said device comprising; a fluid amplifier comprising a body having a chamber, first and second output channels intersecting said chamber whereby one wall of each of said output channels form opposed walls of said chamber; a power stream input channel terminating at an orifice in a wall of said chamber which is intermediate said opposed walls for applying a power stream to said chamber, first and second control signal channels terminating at orifices in said opposed walls for applying fluid control signals to said chamber transverse to the path of said power stream, said control signal orifices being substantially aligned with the path of said power stream applied to said chamber through said power stream orifice whereby said power stream may be selectively deflected to said first or said second output channel by said fluid control signals; inhibit means comprising at least one inhibit signal channel terminating at an orifice in said chamber, for applying inhibit signals to said chamber transverse to the paths of said power stream and said fluid control signals, said inhibit orifice being substantially aligned with the path of flow of said power stream and positioned upstream from the point at which control signals from either of said control orifices deflect said power stream to thereby deflect said power stream from the path of said control signals; and output channel means having an opening in said chamber for receiving said power stream when it is deflected by an inhibit signal.

12. A pure fluid device for performing the logical Inhibit function, said device comprising: a fluid amplifier comprising a body having a chamber, first and second output channels intersecting said chamber whereby one wall of each of said output channels form opposed walls of said chamber; a power stream input channel terminating at an orifice in a wall of said chamber which is intermediate said opposed walls for applying a power stream to said chamber, first and second control signal channels terminating at orifices in said opposed walls for applying fluid control signals to said chamber transverse to the path of said power stream, said control signal orifices being substantially aligned with the path of said power stream applied to said chamber through said power stream orifice whereby said power stream may be selectively deflected to said first or said second output channel by said fluid control signals; first and second channels terminating at orifices in said chamber for applying fluid inhibit signals thereto, said first inhibit orifice being substantially aligned with the path of said power stream in said chamber as it flows from said power stream orifice to said first output channel and said second inhibit orifice being substantially aligned with the path of said power stream in said chamber as it flows from said power stream orifice to said second output channel, said inhibit orifices being further positioned whereby inhibit signals emerge therefrom in a direction transverse to the paths of said power stream to thereby deflect said power stream; and output channel means having an opening in said chamber for receiving said power stream when it is deflected by said inhibit signals.

13. A pure fluid device for performing the logical Inhibit function, said device comprising: first and second fluid conveying means terminating at opposed orifices; means for issuing a power stream between said opposed orifices; means connected to said fluid conveying means for selectively issuing fluid streams from said opposed orifices to selectively strike and deflect said power stream into a first or a second path of flow; third fluid conveying means terminating at a third orifice, said third orifice being positioned upstream from the point at which said power stream is struck by a fluid stream from either of said opposed orifices, said third orifice being aligned with said power stream whereby a fluid stream issuing therefrom strikes and deflects said power stream; and means for selectively applying fluid signals to said third fluid conveying means to deflect said power stream out of the path of fluid streams issuing from said opposed orifices.

14. A pure fluid device as claimed in claim 13 and further comprising: first and second output channels interconnected at one end to form a chamber, said opposed orifices being positioned in the walls of said chamber whereby said power stream is deflected into one of said output channels when struck by a fluid stream issuing from one of said orifices; and a third output channel for receiving said power stream when struck by a fluid stream issuing from said third orifice.

15. A pure fluid device as claimed in claim 14 wherein a dividing element is formed by the intersection of said first and second output channels, said chamber and said dividing element being symmetrically disposed with relation to the path of flow of said power stream before it is deflected whereby said power stream divides and flows substantially equally into said first and second output channels when it is not deflected.

16. A pure fluid logical device comprising: means for producing a power jet; means for selectively producing a control jet having a path of flow coplanar with and intersecting said power jet at a point downstream from where said power jet is produced to thereby deflect said power jet; and means for selectively preventing deflection of said power jet by said control jet, said means comprising means for selectively producing an inhibit jet which flows substantially normal to the plane of said power and control jets and strikes said power jet downstream from where said power jet is produced but upstream from its point of intersection with said control jet.

17. A pure fluid logical device comprising: means for producing a power jet; means for selectively producing control jets having paths of flow coplanar with and intersecting said power jet at points downstream from where said power jet is produced to thereby selectively deflect said power jet; and means for selectively preventing deflection of said power jet by said control jets, said means comprising means for selectively producing an inhibit jet which flows substantially normal to the plane of said power and control jets and strikes said power jet downstream from where said power jet is produced but upstream from its points of intersection with said control jets 18. A pure fluid operated logical element comprising: means for producing a power jet; means for selectively producing control jets having paths of flow coplanar with and intersecting said power stream at points downstream from where said power jet is produced to thereby selectively deflect said power jet into a first or a second path of flow; means for selectively producing an inhibit jet which flows normal to said plane and intersects said first path to thereby selectively deflect said power stream from said first path; and means for selectively producing an inhibit jet which flows normal to said plane and intersects said second path to thereby selectively deflect said power stream from said second path.

References Cited by the Examiner

UNITED STATES PATENTS

| | | | |
|---|---|---|---|
| 1,381,095 | 6/21 | Starr | 239—468 |
| 3,024,805 | 3/62 | Horton | 137—83 |
| 3,071,154 | 1/63 | Cargill et al. | 137—83 XR |
| 3,075,548 | 1/63 | Horton | 137—83 XR |

OTHER REFERENCES

Scientific American, August 1962, vol. 207, No. 2, pages 128–138 (page 130 relied upon).

LAVERNE D. GEIGER, *Primary Examiner.*